May 28, 1957     B. E. PORTER     2,793,660
GANG SAW WITH REMOVABLE FRAME
Filed March 31, 1955     4 Sheets-Sheet 2

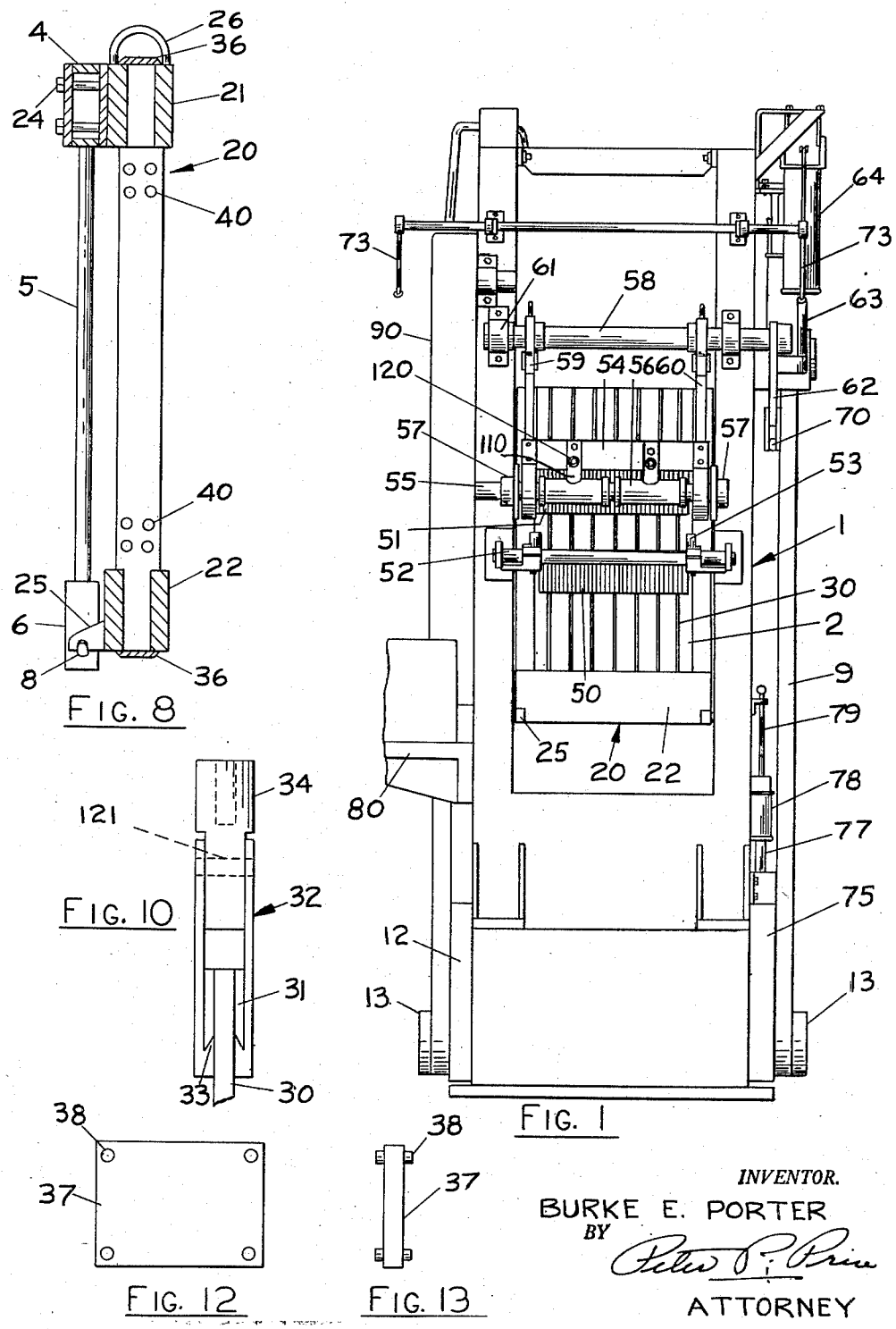

INVENTOR.
BURKE E. PORTER
BY
ATTORNEY

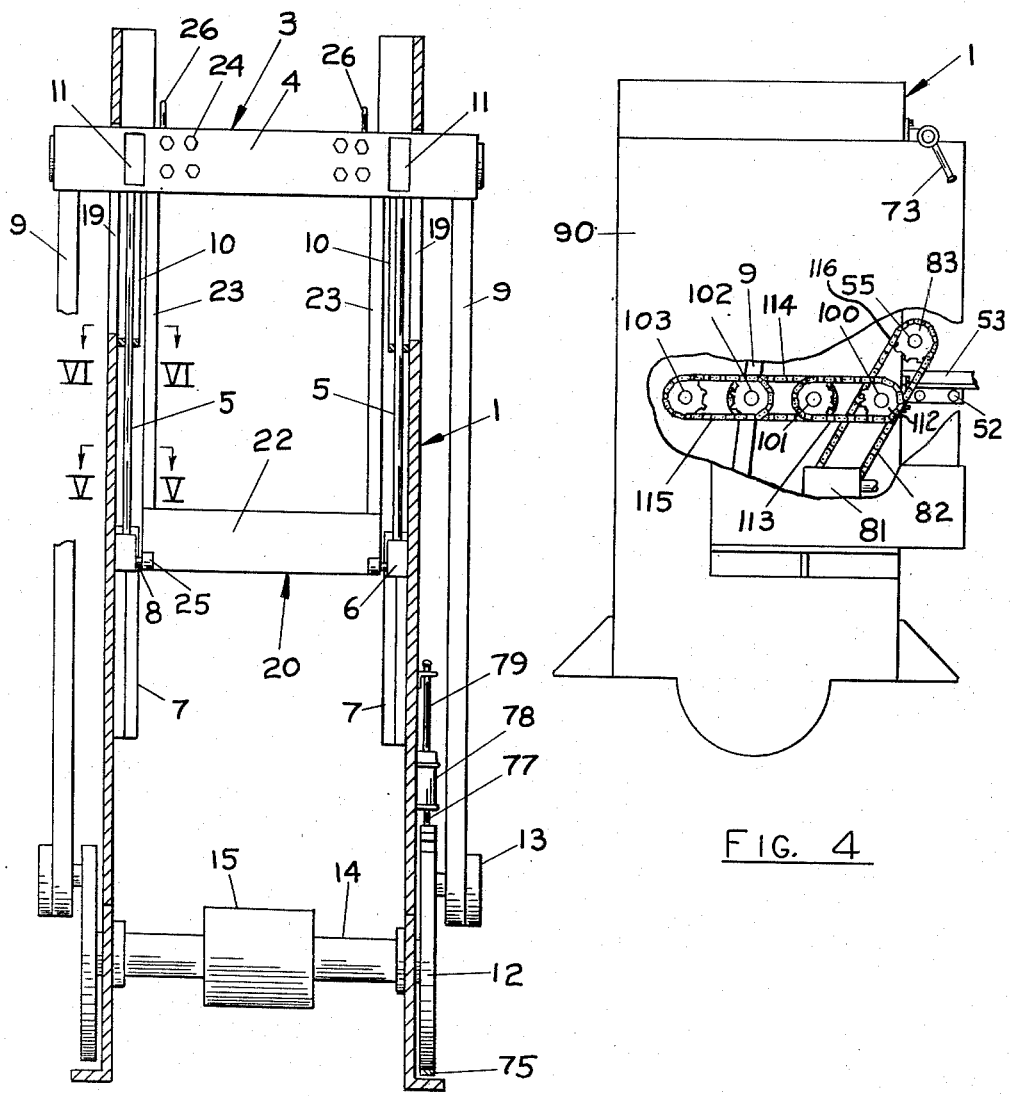

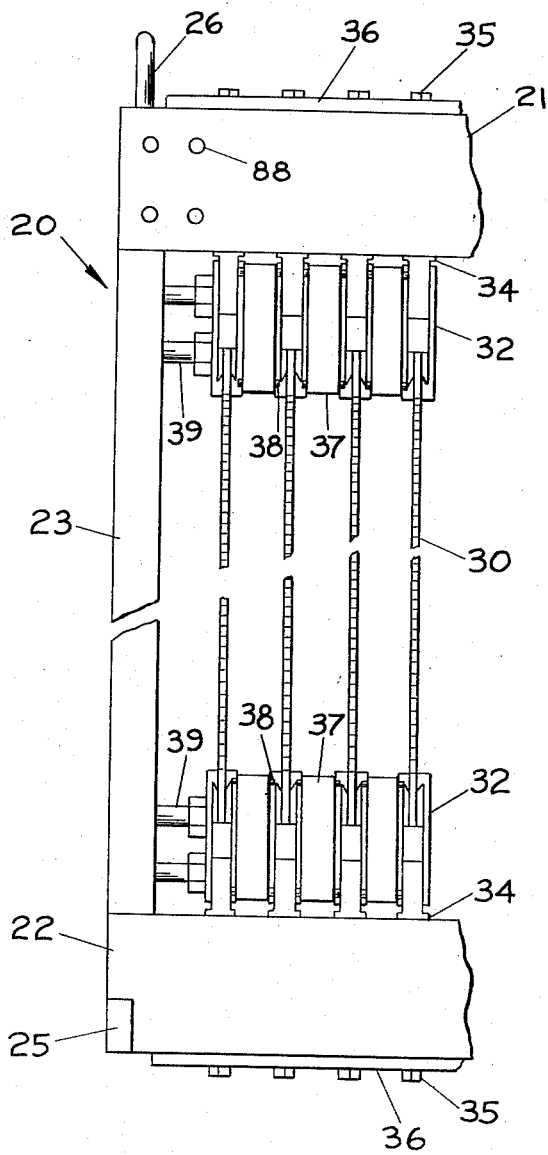
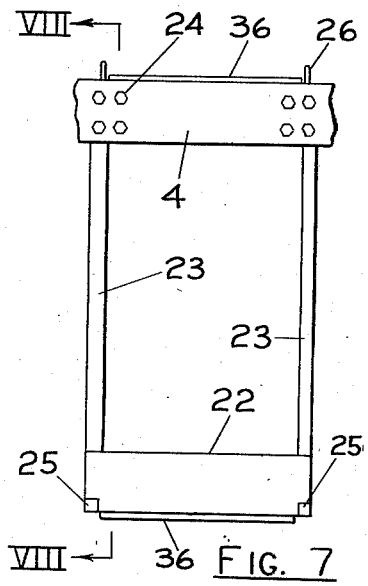
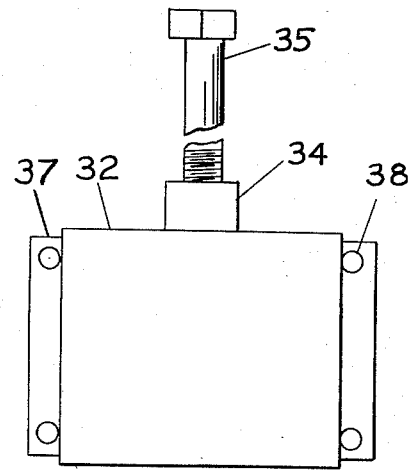

United States Patent Office 2,793,660
Patented May 28, 1957

2,793,660
GANG SAW WITH REMOVABLE FRAME

Burke E. Porter, East Grand Rapids, Mich., assignor to Burke E. Porter Machinery Company, Grand Rapids, Mich., a corporation of Michigan Application March 31, 1955, Serial No. 498,141

1 Claim. (Cl. 143—60)

This invention relates to gang saws and particularly to the construction of the means by which the blades are secured in the machine. The application of this invention extends to many types of operations including such contrasting operations as logging mills and the cutting of small parts in a furniture factory.

One of the big problems of gang saws is the long downtime required for changing the saw blades. Since saw blades dull quickly, this is a frequent operation and normally takes several hours to complete. During this entire period a large and expensive item of equipment is out of operation.

This invention reduces the down-time necessary for blade change to an operation requiring only minutes to complete.

This invention provides the further advantage of making it possible to reduce the spacing between the individual saw blades to a minimum. Whereas prior existing structures normally were limited to a minimum spacing of one-half inch, this invention permits this spacing to be reduced to three-eights of an inch. This feature is particularly important in adapting a high speed machine of this type to the production of thin pieces of wood which heretofore required either a planing operation or machines of greatly reduced capacity.

This invention has the added advantage of providing full adjustability for the spacing between the blades.

A still further advantage of this invention is the simplicity of its structure. This contributes materially to the reduction of both initial and maintenance costs.

These and other objects and purposes of this invention will be immediately seen by those acquainted with the design and construction of machinery for the lumber industry upon reading the following specification and the accompanying drawings.

In the drawings:

Fig. 1 is an end elevation view of a gang saw embodying my invention.

Fig. 3 is a sectional, elevation view taken along the plane III—III of Fig. 2.

Fig. 4 is a side elevation view of the opposite side of the machine from that appearing in Fig. 2.

Fig. 7 (sheet 4) is an enlarged, front view of the saw mounting sash used in my machine.

Fig. 8 (sheet 1) is a sectional, elevation view taken along the plane VIII—VIII of Fig. 7.

Fig. 9 (sheet 4) is an enlarged, fragmentary, front view of the blade sash showing the blades in operating position.

Fig. 10 (sheet 1) is an end elevation view of one of the individual blade clamps.

Fig. 12 (sheet 1) is a side elevation view of one of the blade spacers.

Fig. 13 is an end elevation view of the spacer appearing in Fig. 12.

Fig. 14 (sheet 4) is a side elevation view of one of the blade clamps with the spacer installed.

In executing the objects and purposes of this invention, I have provided a gang saw having a frame slidably mounted for vertical, reciprocating motion. The individual cutting blades are each secured to and tensioned within a blade sash. This sash is an entirely self-contained unit detachably mountable to the reciprocating frame. Thus, by simply changing the sash, all the saw blades may be simultaneously removed and new saw blades installed in the machine as a pre-tensioned and properly spaced group. The removal from and installation in the sash of the individual saw blades is accomplished while the sash is removed from the machine.

The individual clamps for the saw blades and the spacers controlling the distance between each saw blade are so designed that a minimum of spacing is required between each saw blade.

Figure 5:
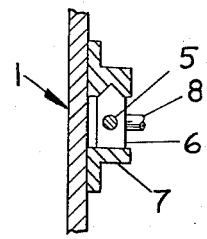
Fig. 5 (sheet 2) is a fragmentary, enlarged, sectional view taken along the plane V—V of Fig. 3.
Figure 6:
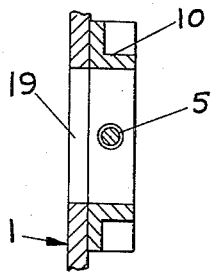
Fig. 6 is a fragmentary, enlarged, sectional view taken along the plane VI—VI of Fig. 3.

Referring specifically to the drawings, the numeral 1 refers to a housing having a work passageway 2 extending thereto (Fig. 1). Within the housing 1 is a reciprocating frame 3 having a top rail 4 from which depend a pair of side rods 5 (Fig. 3). A guide block 6 is secured to the lower end of each of the side rods (Figs. 3 and 5). Each guide block 6 is V-shaped along one edge to hold it against lateral movement by engagement in a similarly shaped channel in one of the lower ways 7. The block 6 is confined between the lower ways 7 for reciprocating motion. Projecting inwardly from each of the guide blocks 6 is a pin 8. The purpose of the pins 8 will be explained more fully hereinafter.

Figure 2:
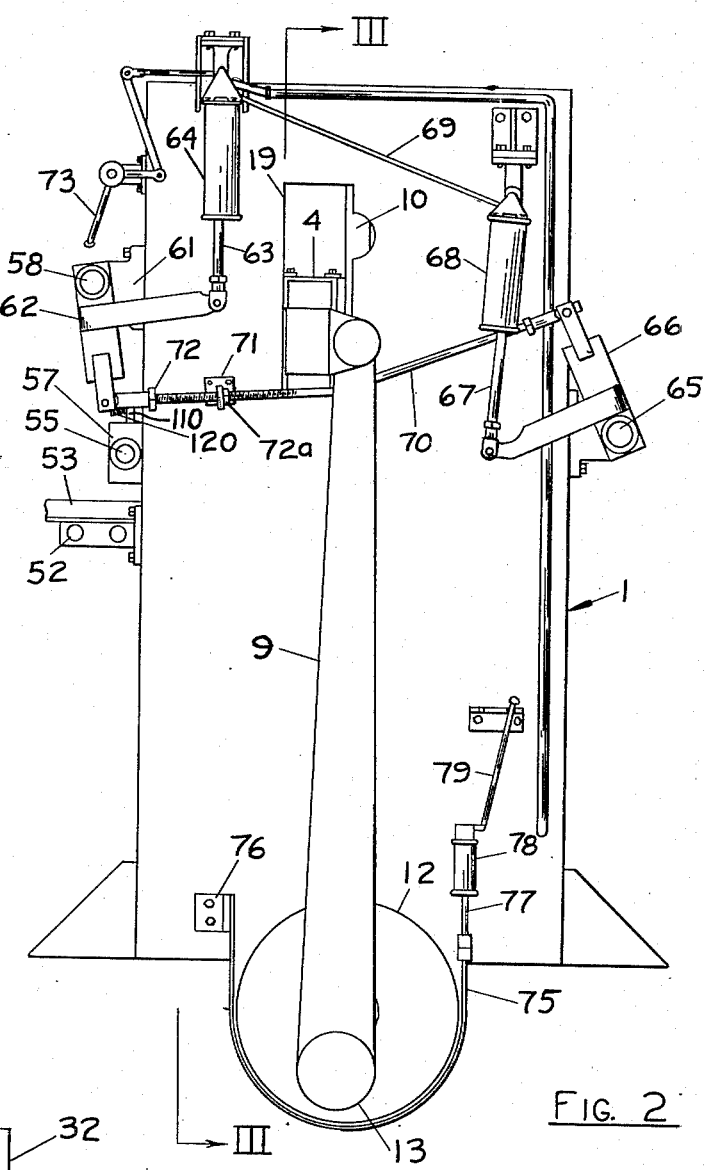
Fig. 2 is a side elevation view of a gang saw embodying my invention.
Figure 11:
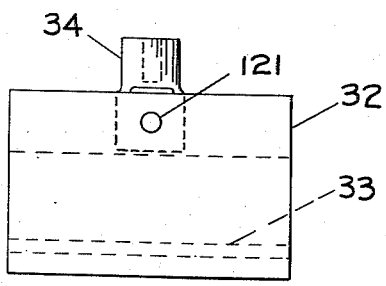
Fig. 11 (sheet 2) is a side elevation view of one of the individual blade clamps.

The top rail 4 extends outwardly through each side of the housing to provide a means for attaching the frame 3 to the upper ends of the pitmans 9. To permit the ends of the top rail 4 to pass through the housing, an elongated, vertical slot 19 is provided on each side panel of the housing (Fig. 2). The top rail 4 is guided in its vertical movement by the upper ways 10. At the points of contact between the top rail 4 and the upper ways 10, wear plates 11 (Fig. 3) are welded to each side face of the top rail 4.

The pitmans 9 extend practically the full height of the machine. Their lower ends are each eccentrically mounted to a fly wheel 12 by means of a crank pin 13. The fly wheels 12 are, in turn, mounted on a common shaft 14 in the center of which is a pulley 15 by which the shaft may be driven by a prime mover.

The reciprocating frame 4 is designed to carry the sash 20 (Figs. 3, 7, 8 and 9). The sash has a split header beam 21 and a split foot beam 22. The beams are connected at their ends by vertical side rails 23. The rails are attached to the head and foot beams by suitable means, such as welding, capable of producing a rigid assembly. The sash 20 is detachably secured to the top rail 4 of the reciprocating frame by suitable bolts 24 on each side (Fig. 7). The bolts 24 carry the primary load of transmitting reciprocating motion from the rail 4 to the sash 20. The foot beam 22 at each end has a projecting finger 25 (Fig. 3) equipped with a notch in the lower face of its outward end. The fingers 25 are adapted to seat over and, by means of the notches, engage the pins 8 on the guide blocks 6.

The sash is provided, at the top, with a pair of bails 26, one on each side. The bails provide a means of grasping the sash 20 when it is to be lifted into or out of the machine.

Mounted within the sash 20 are the saw blades 30. At each end the saw blades have a pair of wedges 31, one on each side, securely fastened to the blade (Fig. 10). By means of the wedges, each blade is individually gripped at each end by a blade hanger 32. The blade hangers have inwardly turned dovetails 33 adapted to engage the wedges 31.

The hangers each have a central boss 34. The lower end of the boss 34 is received into the hangar and is secured thereto by a pivot pin 120. This arrangement permits the hangers to align with the saw blade, eliminating possibility of twisting the blade. The bosses 34 are internally threaded for engagement with the tensioning bolts 35 (Fig. 14). The bosses 34 are designed to seat within the internal slot of the split top and bottom rails 21 and 22. This slot is bridged by a plate 36. The plate 36 is apertured to permit passage of each of the tension bolts 35 with the heads bearing against the plate so that when tightened, they will draw the blades 30 taut.

The hangers 32 are made no wider than that necessary to provide adequate strength for holding the blades. By this construction, it is possible to reduce the spacing of the blades to a minimum. It is by this means that this machine is capable of using a three-eights of an inch spacing between the blades rather than the conventional one-half inch. Further, because of the rigidity of the frame and the positive mounting of the blades, a thinner blade may be used. The result is a substantial reduction in the amount of wood wasted by the machine in the creation of the blade kerfs. When large volumes of wood are being processed, this reduction in waste amounts to an appreciable quantity of lumber.

When it is desired to space the blades 30 a distance greater than that resulting from arranging the hangers 32 in abutting relationship, this is accomplished by placing spacers 37 between the hangers on both ends of the blades (Figs. 9, 12, 13 and 14). The spacers 37 are rectangular plates each mounting four pins 38 extending from each face of the spacer. The pins are designed to extend over and engage the sides of the hangers 32. The purpose of the pins 38 will be explained more fully under "Operation." In order to clamp the hangers and spacers tightly together, pressure bolts 39 are threadedly mounted in suitable holes 40 in one of the side rails 23 (Figs. 8 and 9). By rotation of the bolts 39 in the proper direction, their heads are caused to bear tightly against the hangers and to press the hangers and the spacers tightly together so there can be no displacment during the operation of the saw.

In the work passage 2 on each side of the saw blades 30, are work piece moving rollers. These rollers are of conventional design. A pair of driven rollers are employed on each side of the saw blades. Only the first feed roller 50 is shown. This roller is mounted on the shaft 100 (Fig. 4). The other driven feed roller is mounted on the shaft 101. The two driven rollers on the discharge side are mounted on the shafts 102 and 103.

Above the first driven feed roller 50 is a powered pressure roller 51. Pressure shoes of conventional design are employed above the other driven rollers. These are not illustrated as they form no part of the invention and an understanding of their details is unnecessary to an understanding of this invention.

The driven rollers on the feed side push the work pieces into the saws while the work rollers on the discharge side pull them through the saws. Before the work pieces engage the lower work rollers 50, they are initially supported by a pair of smooth, stationary rods 52. The work pieces are confined to the passageway against lateral displacement by guide rails 53.

The pressure roller 51 consists of two independent halves each of which is separately driven and is mounted on the inward end of a pivoted arm. The arms are pivotally secured to the driven shaft 55 by the hangers 56. Above the hangers 56 is a stationary cross-piece 54. Each of the hangers 56 has an upwardly projecting lever arm 110 biased toward the cross-piece 54 by a spring 120. The springs 120 urge the rollers 51 downwardly. The shaft 55 is supported by journal blocks 57 on each side of the passageway 2. Power from the driven shaft 55 is delivered individually to each half of the roller 51 by means of a chain and sprocket combination mounted one on each side of the passageway 2. The chain and sprocket arrangement is not shown inasmuch as it is conventional and it is not considered a part of this invention.

The shaft 55, rollers 51, cross-piece 54 and hangers 56 collectively constitute a carriage adapted to vertical movement as a unit. Mounted above the shaft 55 is a rocker shaft 58. A pair of inwardly extending arms 59 are secured to the rocker shaft 58 for pivotal movement with the shaft. The inward ends of the arms 59 are connected by vertical levers 60 to the carriage supporting the driven rollers 51. The rocker shaft 58 and the levers 60 apply downward pressure on the carriage urging it toward the work piece. The purpose of this arrangement will be explained under "Operation."

The rocker shaft 58 is mounted in bearings 61 secured to the housing 1 on each side of the passageway 2. Secured to one end of the rocker shaft 58 is a somewhat T-shaped lever arm 62 (Figs. 1 and 2). One end of the lever arm 62 is connected to a reciprocating piston 63 driven by the cylinder 64. The piston 63 may be operated pneumatically or hydraulically.

A second rocker arm 65 is provided for the pressure shoes above the discharge rollers on the opposite end of the passageway 2. A second generally T-shaped lever arm 66 is mounted on the end of the second rocker shaft 65. The second lever arm 66 is also secured to the reciprocating piston 67. The piston 67 is operated by the second operating cylinder 68. In order to assure simultaneous operation of the cylinders 64 and 68, they are interconnected by the conduit 69.

The lever arms 62 and 66 are interconnected by a coordinating rod 70. The coordinating rod 70 passes through an opening in the fixed stop 71. In the area of the stop 71, the coordinating arm 70 is threaded to receive the limiting nuts 72 and 72a. By adjustment of the limit nuts 72 and 72a, the limits of vertical travel of the driven roller on the feed side and the pressure shoes on the discharge side are established simultaneously. Also, this serves to coordinate these elements for accurate, equal spacing from the lower driven rollers. A hand lever 73 is provided for manual actuation of the pistons 63 and 67.

In order to bring the reciprocating frame 3 to a halt at the correct position for access to the sash 20, a brake is provided on one of the fly wheels 12 (Fig. 2). The brake consists of a band 75 engaging a portion of the periphery of the fly wheel and anchored at one end to the stationary bracket 76. The other end of the brake band 75 is secured to the reciprocating piston 77 of an actuating cylinder 78. A hand lever 79 is provided to control actuation of the cylinder 78.

While the reciprocation of the blades 30 is powered by a prime mover which is not part of this machine, another prime mover is provided on one side of the machine for driving the rollers 50 and 51. This prime mover is mounted on a bracket 80 (Fig. 1). The power from the prime mover is delivered to a gear reducer 81 which in turn drives a chain 82 (Fig. 4). The chain 82 engages a sprocket 112 on the end of the shaft 100. A chain 116 driven from the shaft 100 drives the sprocket 83 on the end of the shaft 55. Another chain 113 driven from the shaft 100 drives the shaft 101. The shafts 102 and 103 are driven by the chains 114 and 115 respectively. Since the chains and sprockets present a personnel hazard, they are normally enclosed by a suitable protective cover 90.

Operation

To prepare this machine for operation, the sash 20 is removed and laid horizontally on a table. In this position the saw blades 30 are mounted in the hangers 32.

The bosses 34 on the hangers, being engaged within the split top and bottom rails 21 and 22, hold the hangers sufficiently close to their proper position that the blades may be properly located. As the blades are assembled to the hangers, spacers 37 of the proper thickness are placed between each of the hangers. This determines the spacing between the blades 30 and thus the thickness of the lumber produced by the saw. The spacers are held in proper position by the pins 38. No matter which way the spacers are placed in the assembly, at least one pair of the pins 38 will engage the edges of the hangers and hold the spacers in place until the whole assembly is locked. After all the hangers and the spacers are in place, the pressure bolts 39 are tightened, thus pressing the hangers and the spacers tightly together, preventing any further relative movement between them. If necessary, a lock nut may be provided on each of the pressure bolts 39 to prevent these bolts accidentally loosening under the operating vibration of the machine. Each individual blade 30 is properly tensioned by means of the tension bolts 35. Thus, each blade may be tensioned to the proper degree to assure a clean, narrow and efficient cut and to assure maximum blade life.

After assembly of the saw blades is complete, the sash 20 may be grasped by the bales 26 and placed in the machine. When it has been properly placed, the mounting bolts 24 are installed. These engage suitable threaded openings 88 in the top rail 21 of the sash 20. As the sash is swung into the machine, it is lifted slightly to permit the ears 25 to pass over and seat upon the pins 8 of the guide blocks 6.

These few operations complete installation of the sash in the machine. Upon release of the brake 75 the machine may be started. The limit nuts 72 and 72a (Fig. 2) are adjusted to provide the proper limits of vertical travel of the upper feed roller 51 and the pressure shoes on both the feed and discharge sides of the machine for the thickness of work to be passed through the machine. By manipulation of the handle 73, the cylinders 64 and 68 are actuated to position these pressure elements at a height where they will be slightly lifted by the work entering and leaving the machine. This assures sufficient pressure that the rollers will have enough frictional engagement with the work pieces to push or pull them through the cutting blades 30.

The pressure elements on the feed side are vertically adjusted collectively by proper vertical positioning of the carriage. On the discharge side of the machine, the pressure shoes above each of the driven rollers are also collectively movable by means of a vertically adjustable carriage mounting all of the pressure shoes.

The pressure shoes each consist of a plurality of individual fingers each separately biased to press against the work piece or cant. Thus, at least two cants of different heights may be simultaneously fed into the machine. The individual mounting of the two halves of the feed pressure roller 51 permits each to adjust to this differential under the urging of the springs 111. The individual fingers of the pressure shoes assures proper application of pressure to the cants despite the height differential. Thus, the machine may be utilized to full capacity at all times.

This machine is designed to operate with a relatively short stroke but with a high operating speed. The use of the split head and foot beams 21 and 22 on the sash permit a strong frame to be constructed for holding the blades with a minimum of weight. This is important because the momentum of both the frame and the sash must be overcome at each end of the cutting stroke.

The life of a sharpened edge on the cutting blades 30 in a machine of this type is relatively short. Thus, the blades must be frequently changed. Heretofore this has required several hours of down-time. To overcome this difficulty it has been conventional practice to provide more than one machine so that one machine may be operated while the other machine is idled for blade change. While this eliminates the necessity of paying an idle crew during the period of blade change, it involves a substantial capital investment.

This invention eliminates this difficulty since the actual installation of the sash 20 takes a short time, normally ten to fifteen minutes. It may thus be economically performed any time a change in board thickness is necessary or the saws become dull. While the machine is operating with one of the sashes 20, another sash is laid out on the assembly table and a set of sharp saw blades is installed. Thus, when the operating blades become dull, all of the tedious time consuming job of installing, spacing, tensioning and aligning the blades has already been accomplished before it is necessary to shut down the machine for blade change. To effect a complete blade change, all that is done is to exchange sashes. This not only is important because of the time reduction but also makes possible rapid change from one blade spacing to another. Thus, the machine's versatility is greatly increased and one machine is capable of doing the work normally requiring two or more machines. This represents a considerable saving both in operating costs and in initial investment.

Since the blades may be completely assembled and individually tensioned in the sash while the sash is laid out on a table where all parts of the operation are fully accessible, it is possible to use a thinner blade since a precise tension and alignment of the blade may be easily and quickly effected. The use of narrower blades is desirable because of the attendant reduction in waste due to narrower kerfs. Machines of this type are normally employed in large production mills where a reduction of a mere sixteenth of an inch in the width of the kerf will result, over a period of time, in a saving of many thousands of board feet of lumber which otherwise is wasted as sawdust. Thus, the initial cost of the machine may be recovered to no small measure by increased efficiency in its operation.

The design of the machine which permits the spacing between the blades to be reduced from a minimum of one-half inch to a minimum of three-eights inch also adds greatly to the capacity of the machine. It is often desirable to cut thin boards, particularly for such operations as light crating and other applications. Heretofore, it was necessary to rough out the board in a machine of this type. These boards were then passed through a second machine and a second operation in which the board was planed or split to the thinner size. By reason of this invention, these two operations may be combined and carried out simultaneously in a single machine, thus greatly reducing the labor and other costs incident to using thin lumber.

It will be recognized that while I have described a preferred embodiment of my invention, various modifications of this invention may be made. Each of these modifications which embodies the principles of this invention is to be considered as included in the hereinafter appended claim unless the claim, by its language, expressly states otherwise.

I claim:

A gang saw comprising a housing; upper vertical guideways one mounted within and on each side of the upper end of said housing; a horizontal rail reciprocally mounted in and betwen said upper guideways; means for reciprocally driving said rail up and down in said guideways; a pair of side rods secured to and extending downwardly from said rail one on each side of said housing; separate guide blocks secured to the lower ends of said rods; lower vertical guideways one within and on each side of the lower end of said housing; said guide blocks being mounted for reciprocal sliding movement in said lower guideways; a pin extending inwardly from each of said guide blocks; a separate saw blade sash having a plurality of saw blades extending from one end to the other; said sash having a header beam at its top end and a foot beam at its bottom end to which beams said blades are attached; means for detachably securing said header beam to said rail; a pair of hooked-shaped ears on said foot beam, said ears being adapted to hook over said pins.

References Cited in the file of this patent

UNITED STATES PATENTS

| | | |
|---|---|---|
| 76,969 | Andrews | Apr. 21, 1868 |
| 105,370 | Rhodes | July 12, 1870 |
| 510,962 | Deuther | Dec. 19, 1893 |
| 914,154 | Miles | Mar. 2, 1909 |
| 1,838,437 | Moses | Dec. 29, 1931 |
| 2,166,627 | Evrell | July 18, 1939 |
| 2,443,050 | Menking | June 8, 1948 |

FOREIGN PATENTS

| | | |
|---|---|---|
| 130,467 | Austria | Nov. 25, 1932 |
| 138,331 | Australia | Aug. 15, 1950 |